United States Patent
Ibach et al.

[19]

[11] Patent Number: 5,884,465
[45] Date of Patent: Mar. 23, 1999

[54] CUTTER ASSEMBLY FOR MOWING APPARATUS

[75] Inventors: Adolf Ibach, Remscheid, Germany; Robert L. Powers, Easton, Ill.

[73] Assignee: Carl Sülberg GmbH & Co., Remscheid, Germany

[21] Appl. No.: 626,777

[22] Filed: Apr. 2, 1996

Related U.S. Application Data

[63] Continuation-in-part of Ser. No. 486,077, Jun. 7, 1995, Pat. No. 5,617,712, which is a continuation-in-part of Ser. No. 300,056, Sep. 2, 1994, abandoned.

[51] Int. Cl.⁶ .................................................. H01D 34/17
[52] U.S. Cl. ............................. 56/298; 56/311; 56/307; 411/304
[58] Field of Search .............................. 56/298, 304, 300, 56/305, 306, 311, 307, 309, 297, 312; 411/304

[56] References Cited

U.S. PATENT DOCUMENTS

| | | |
|---|---|---|
| 13,433 | 8/1855 | Morrison . |
| 304,686 | 9/1884 | Allen . |
| 379,881 | 3/1888 | Voss . |
| 644,040 | 2/1900 | Cleveland . |
| 870,358 | 11/1907 | Griffiths . |
| 1,945,301 | 1/1934 | Wilson . |
| 2,024,309 | 8/1935 | Smith . |
| 2,484,652 | 10/1949 | Schoenrock . |
| 2,528,659 | 11/1950 | Krause . |
| 3,099,125 | 7/1963 | Turner . |
| 3,298,164 | 1/1967 | Salyards . |
| 3,401,512 | 9/1968 | Pool et al. . |
| 3,455,093 | 7/1969 | Stern . |
| 3,514,932 | 6/1970 | Horowitz . |
| 3,722,196 | 3/1973 | Templeton . |
| 4,387,554 | 6/1983 | Bedogni . |
| 4,519,192 | 5/1985 | Oppenhuisen et al. . |
| 4,553,380 | 11/1985 | O'Halloran . |
| 4,896,391 | 1/1990 | Rowley ........................... 411/304 X |
| 5,343,682 | 9/1994 | Puncochar . |
| 5,407,312 | 4/1995 | Terrizzi ................................ 411/304 |
| 5,487,259 | 1/1996 | Powers et al. . |

FOREIGN PATENT DOCUMENTS

| | | |
|---|---|---|
| 2546367 | 5/1984 | France . |
| 1507170 | 9/1966 | Germany . |
| 1816316 | 12/1968 | Germany . |
| 2343491 | 8/1973 | Germany . |
| 1155464 | 6/1989 | United Kingdom . |

OTHER PUBLICATIONS

Klein, *Einführung in die DIN–Normen*, 1985.

*Primary Examiner*—Heather Shackelford
*Attorney, Agent, or Firm*—Synnestvedt & Lechner

[57] ABSTRACT

A cutter assembly for a mowing apparatus having at least two guards. Each guard includes a guard body, a tine, and a knife slot for receiving a knife section. A connecting web connects the two guards. An upper trashbar is fixed between the two guards above the knife section. Extending from the upper trashbar is a hold-down member movable into contact with the knife section.

25 Claims, 5 Drawing Sheets

CUTTER ASSEMBLY FOR MOWING APPARATUS

CROSS REFERENCE TO RELATED APPLICATIONS

This application is a continuation-in-part of application Ser. No. 08/486,077 filed Jun. 7, 1995, which issued on Apr. 8, 1997 as U.S. Pat. No. 5,617,712, which is a continuation-in-part of application Ser. No. 08/300,056 filed Sep. 2, 1994 which is now abandoned.

BACKGROUND

1. Field of the Invention

The invention relates to a cutter assembly for a mowing apparatus. More particularly, the invention pertains to an apparatus having at least two guards where each guard has a guard body and a tine secured to the guard body. Between the guard body and the tine is a knife slot in which is positioned a knife section. The knife section reciprocates as the cutter assembly moves during the cutting operation. A means to hold down the knife section during operation is provided.

2. Description of the Related Art

In one known sickle guard of this type (GB-A-1155464) cast or forged hold-down clips 13 are arranged at spaced intervals along a mounting member 10. Each clip 13 is T-shaped in plan view and is fixed by means of two guard mounting screws 18 to the cutter bar 10. A forwardly extending portion 43 has an undersurface 45 arranged to come into sliding contact with the upper faces of the knife sections 31. The clips 13 and their assembly and possible adjustment perpendicular to the upper faces of the knife sections 31 are costly and heavy.

From U.S. Pat. No. 3,722,196 it is known to divide each hold-down clip 21 into a mounting flange 23 and a hold-down arm 22 which is linked thereto at 39 and 40 so as to be capable of being raised and lowered. By means of an adjustment screw 43 inserted into the rearward end of the hold-down arm 22 and engaging at 44 against the cutter bar 11, there is a minimum distance between a lower guide face 41 of the hold-down arm 22 and the knife sections 19. This design requires increased expenditure.

From the French patent application 2546367 A1 it is known to adjust the height of the knife slot 62 so that instead of an upper lip, one has a separate upper portion 54 of the sickle guard 12 which is able to be raised and lowered on a mounting screw 14. The upper portion 54 has a fixed support runner 70 behind the screw 14 and an adjustable support screw 68 in front of the screw 14. The supports 68 and 70 rest on a carrier plate 48 which is supported on the cutter bar 10 by means of a spacer plate 14. This design is associated with particularly high manufacturing and assembly costs.

U.S. Pat. No. 4,519,192 teaches a hold down bar 24 having a center section 24C that is formed downwards in the direction of the knife sections 20 in order to hold the knife sections 20 down. This hold down bar is not adjustable during the life of the sickle guard.

SUMMARY OF THE PRESENT INVENTION

One object of the present invention is to simplify and improve the means for holding down the knife sections.

This object is achieved by a mowing apparatus having at least two guards spaced from one another. Each guard has a guard body, a tine secured to the guard body, a knife slot between the guard body and the tine for receiving the knife section, and a ledger surface facing the knife section. The guards are connected by a connecting web fixed between them. An upper trashbar is fixed between the two adjacent guards. To hold down the knife section during operation, a hold-down member extends from the upper trashbar and is movable into contact with the knife sections.

The holding down of the knife sections has the purpose of achieving and maintaining optimum cutting action between the knife section cutting edges and the cutting edges of the guards which cooperate therewith. If there is too great a distance between these cutting edges transversely to the stroke direction of the knife sections, then the growth and material to be cut will not be cut cleanly but rather will be squashed or knocked off. This can lead to damage of the mowing apparatus in use and increase the drive energy requirements. Furthermore, if the upward movement of the knife sections is not restrained during use, these knife sections could strike against the tines of the guards during their reciprocating stroke movement. This could lead to breakage of the guards and do damage to the knife sections. The hold-down member of the present invention can be used with advantage independently of the type of the particular guard and independently of the type of knife sections used. Thus, knife sections with serrated facets can be used without any difficulty. By means of the hold-down member of the present invention, special, bulky hold-down means fixed to the cutter bar are superfluous. The hold-down member of the present invention also allows a considerable reduction in the weight carried by the cutter bar in total and ensures a better flow of crops.

The hold-down member is preferably adjustable relative to the upper trashbar in the direction towards and away from the knife sections. This gives the advantage that the knife section cutting edges are always brought into the optimum position in relation to the corresponding cutting edges on the guards. As a rule, it is desirable that the underside of the knife sections press with minimal force against the cutting surfaces of the guards. Subsequent adjustment can be made quickly and accurately even during the mowing operation.

Preferably, the hold-down member has an external thread and fits into a threaded hole provided in the upper trashbar. This results in a particularly simple and easy mounting of the hold-down member in the upper trashbar. Also, eventual replacement of hold-down members can be effected with little cost.

In one embodiment, the hold-down member comprises a ball member biased into contact with the upper face of the knife sections by spring means. This gives a functionally reliable and very low friction design for the hold-down member. They can be formed, for example, as ball plungers. This type of hold-down member may further include stop means for limiting displacement of the ball member from the hold-down member. This reduces wear on the hold-down member and on the knife sections.

In another embodiment, the hold-down member comprises a stud screw-like member screwed into the threaded hole of the upper trashbar to hold down the knife section.

Additional objects, advantages and novel features of the invention will be set forth in part in the description which follows, and in part will become apparent to those skilled in the art upon examination of the following, or may be learned by practice of the invention.

BRIEF DESCRIPTION OF THE DRAWINGS

The foregoing summary, as well as the following detailed description, will be better understood when read in conjunction with the figures appended hereto. For the purpose of illustrating the invention, several embodiments are shown in the drawings. It is understood, however, that this invention is not limited to the precise arrangement and instrumentalities shown. In the drawings.

DETAILED DESCRIPTION

U.S. Pat. No. 5,487,259 and U.S. patent application Ser. No. 08/486,077 both disclose cutter assemblies and are hereby incorporated by reference.

Figure 1:
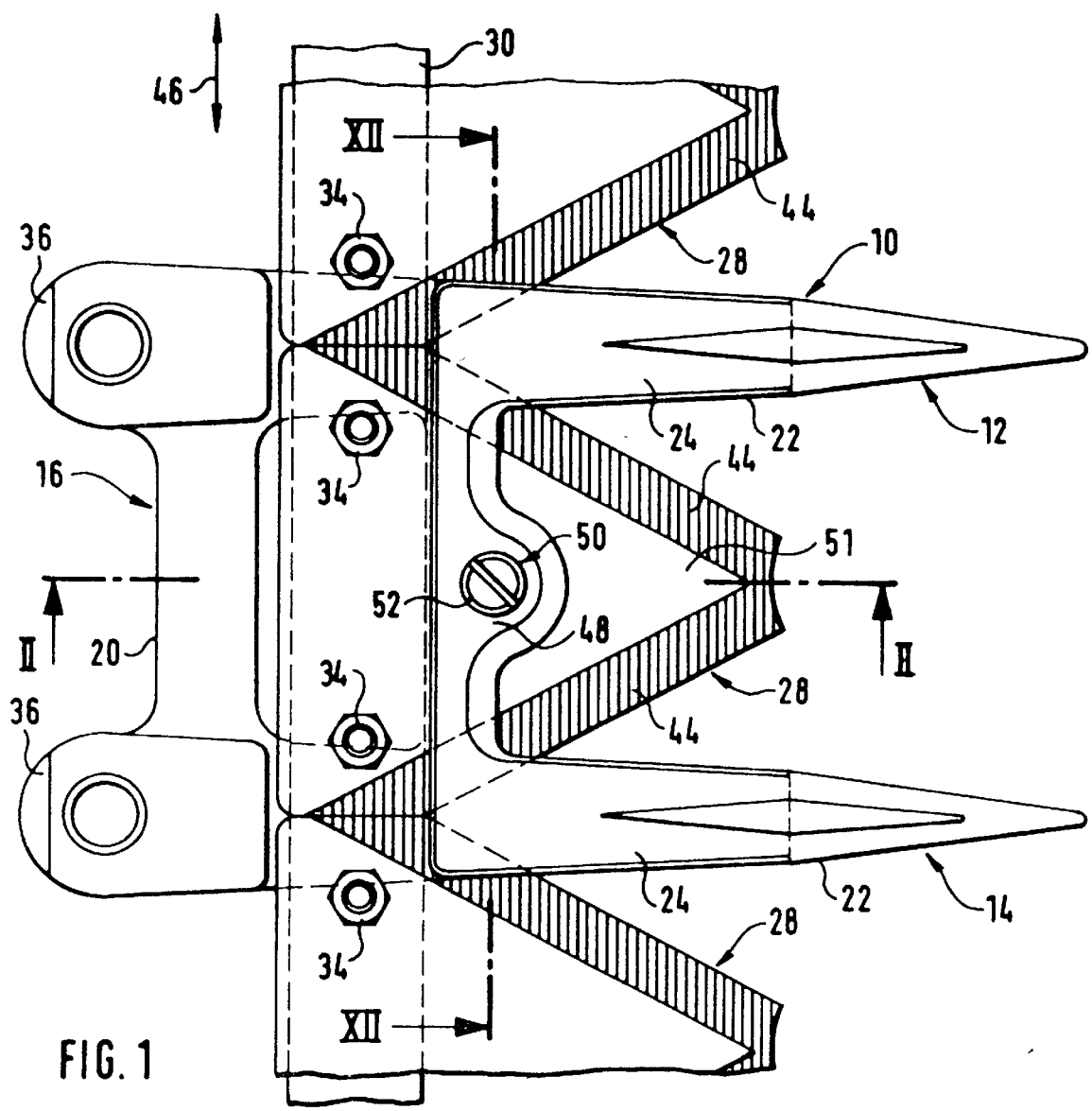
FIG. 1 is the plan view of a cutter assembly formed as a double sickle guard.
Figure 2:
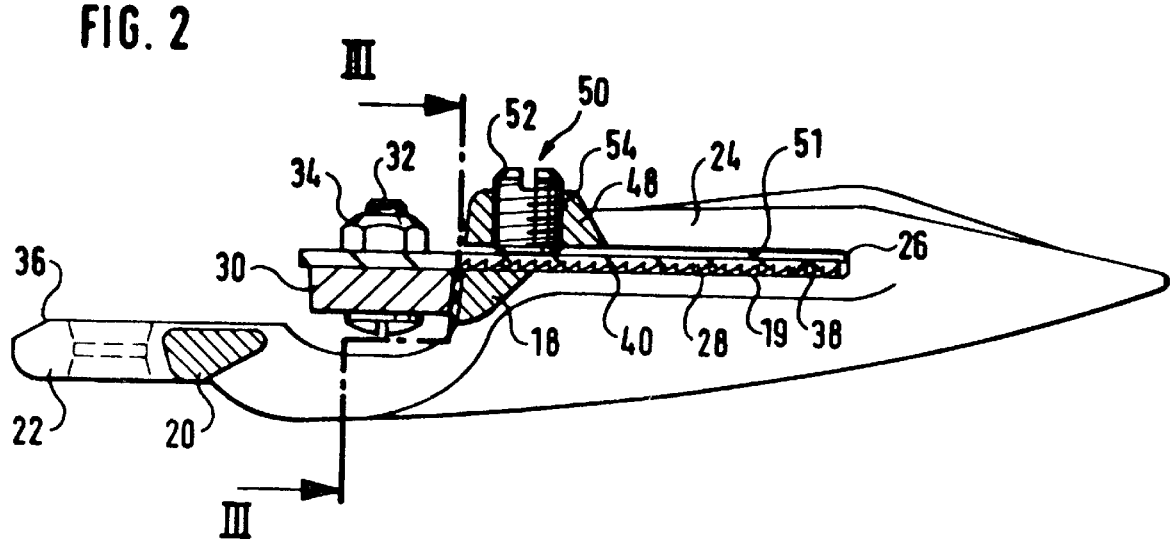
FIG. 2 is a sectional view taken along the line II—II in FIG. 1.
Figure 3:
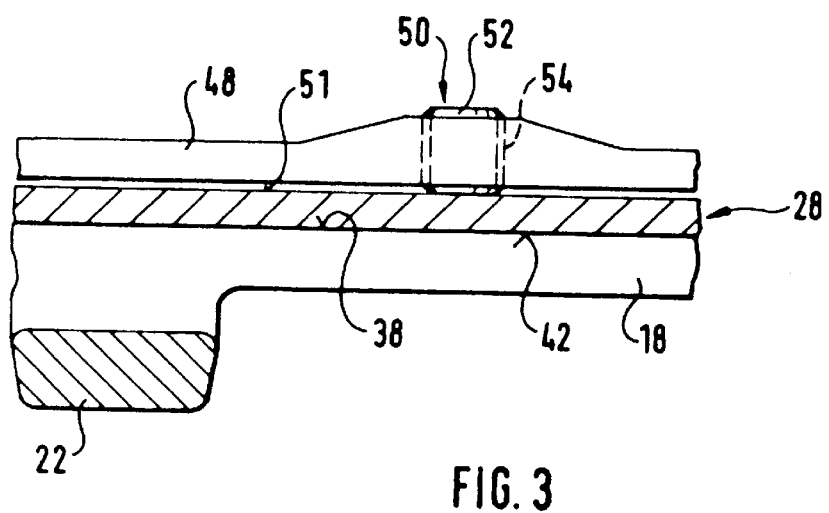
FIG. 3 is a partial sectional view taken along the line III—III in FIG. 2.

Referring to FIGS. 1, 2 and 3, a preferred embodiment of the present invention is illustrated. The sickle guard 10 comprises two guards 12 and 14 connected rigidly together by a connecting web 16 to form a one-piece multiple (in this case, double) sickle guard. In the illustrated embodiment, the connecting web includes a forward connecting web 18, also known as a lower trashbar, in front of a knife back 30, and a rearward connecting web 20 behind the knife back. Each guard 12, 14 may carry an outer trashbar as disclosed in the references incorporated herein.

Each guard 12, 14 comprises a guard body 22 and a tine 24 fixed to a forward section of the guard body 22 at the right-hand side as shown in FIGS. 1 and 2. Between each guard body 22 and its tine 24 is a knife slot 26 (FIG. 2) to receive reciprocable knife sections 28 which are secured to a knife back 30 by special screws 32 and self-locking nuts 34 as shown. The knife back 30 may be supported in any suitable manner. For example, the guards may have a wear bar as shown in the incorporated references, or may have extra guiding devices mounted to the cutter bar to which the sickle guards are screwed as known in the art. Examples of guards without a wear bar include those used in combines, i.e. harvester-threshers.

Each guard body 22 is releasably securable via a mounting pad 36 and by means of guard mounting screws to a cutter bar of a mower in a known manner. Each guard body 22 has a ledger surface 38 (FIG. 2) having lateral cutting edges 40 facing the knife sections 28. Each knife section 28 is provided with a bottom face 42 and, at the sides, with facets 44 defining knife section cutting edges as illustrated. The knife section 28, secured to the knife back 30 are drivable back and forth in stroke directions 46 indicated by a double-headed arrow (FIG. 1). In this case the facets 44 are serrated. The facets could, however, alternatively be ground smoothly onto the knife sections or could be formed in any suitable manner known in the art.

An upper trashbar 48 is fixed between the tines 24 of the two adjacent guards 12 and 14 above the knife sections 28 as shown. At least one hold-down member 50 extends from the upper trashbar 48 to hold down the knife sections 28 in the direction towards the ledger surface 38 of the guard bodies 22. The hold-down member 50 is movable into contact with the top face 51 of the knife section 28. Preferably, the hold-down member 50 is adjustable relative to the upper trashbar 48 in the direction towards and away from the knife sections 28. More preferably, the hold-down member 50 comprises a stud screw 52 having an external thread for engaging a threaded 10 mm diameter hole 54 in the upper trashbar 48 in which the hold-down member 50 is received.

In the particular example illustrated in FIGS. 1, 2 and 3, the longitudinal center of the upper trashbar 48 is widened both in the vertical and in the forward directions to accommodate the threaded hole 54. It is preferred to have a hold-down member only in the upper trashbar 48 as shown, and not also in the tines 24.

Figure 4:
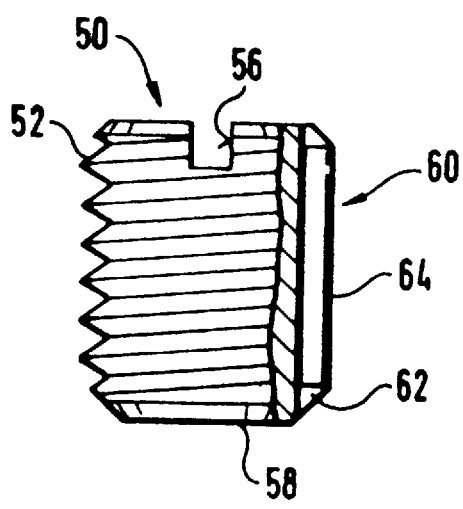
FIG. 4 is a sectional view of one embodiment of a hold down member having a locking element.
Figure 4A:
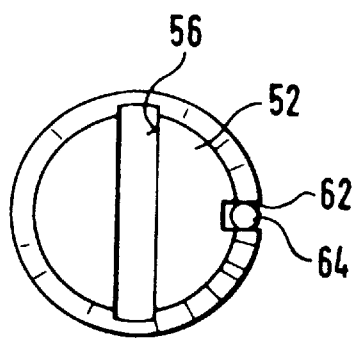
FIG. 4A is a top view of the hold down member of FIG. 4.

Illustrated in FIGS. 4 and 4A is a preferred embodiment of the hold down member 50 shown in FIGS. 1, 2, and 3. The hold down member comprises the stud screw 52 having an external thread for engaging the threaded hole 54 in the upper trash bar 48, and a top slot 56 by which the stud screw 52 can be adjusted with a screw driver. Adjustment of the hold down member to hold the knife section 28 down is made by rotating the stud screw 52 to the desired position. Overtightening is avoided by placing a thin piece of material, preferably a very thin steel sheet, between the bottom 58 of the stud screw 52 and the top face 51 of the knife section 28. The sheet is then pulled out sideways and the system adjusted. The play between the bottom 58 and the knife section 28 should be minimal and the steel sheet correspondingly very thin.

A locking element 60 is provided with the stud screw 52 to prevent inadvertent loosening of the hold down element 50 once it has been adjusted and set to its operating position. Referring to FIGS. 4 and 4A, a longitudinal slot 62 has been machined into the outer side of the stud screw 52 and a strip 65 of polyamide (such as nylon) pressed thereinto. The strip 64 extends into or even a little beyond the thread of the stud screw 52.

Figure 5:
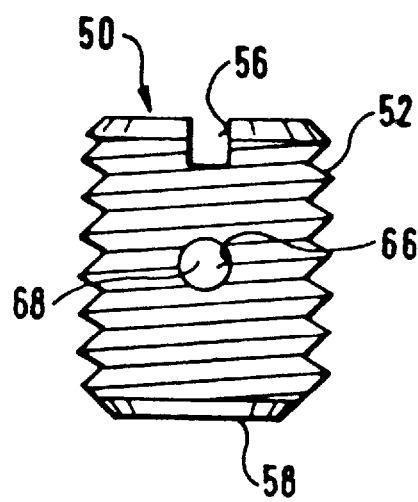
FIG. 5 is a sectional view of another embodiment of a hold down member having another locking element.
Figure 5A:
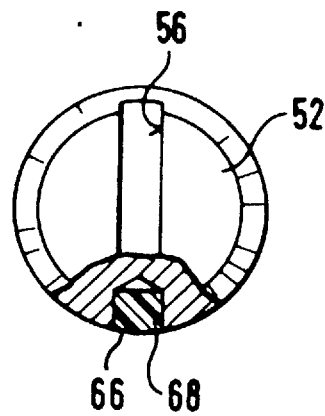
FIG. 5A is a top view of the hold down member of FIG. 5.

FIGS. 5 and 5A illustrate another embodiment of a locking element 60 for stud screw 52. In this embodiment, the locking element 60 is in the form of a plug 66 of polyamide pressed into a transverse blind hole 68 provided in the side of the stud screw 52 as shown.

It is understood that materials other than polyamide may be used so long as they provide enough friction in the thread between the stud screw 52 and stud hole 54 to prevent loosening of the stud screw 52 once it has been set at the desired axial position.

Figure 6:
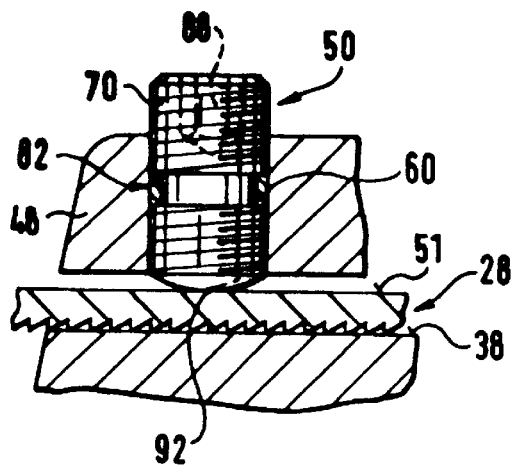
FIG. 6 is a sectional view of another embodiment of a hold-down member.
Figure 7:
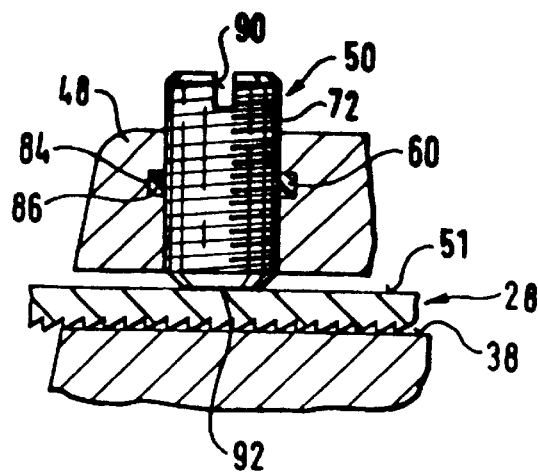
FIG. 7 is a sectional view of a further embodiment of a hold-down member.

Additional embodiments of the hold-down member 50 are illustrated in FIGS. 6–11. Each hold-down member 50 is shown as a solid stud screw member 70, 72, 74, 76, 78, and 80, respectively as shown in FIGS. 6–11, having an external thread adapted to be screwed into the threaded hole 54 of the trashbar 48 as previously described and a bottom 92. FIGS. 6 and 7 show stud screw members 70, 72 in relation to trashbar 48 and knife section 28. Adjustment of the stud screw members to hold down knife section 28 is made by rotating the hold-down member to the desired position in a similar manner as described above.

Figure 11:
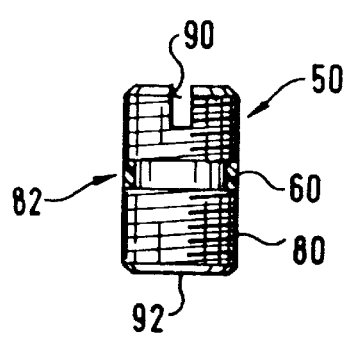
FIG. 11 is a side view of yet another embodiment of a hold-down member.

The stud screw members 70, 72, 74, 76, 78, and 80 preferably have standard end configurations of threaded bolts such as the corresponding ones according to German Standard DIN 78, Einführung in die DIN-Normen, 1985. FIG. 11, in particular, represents a non-standard stud bolt whose lower end has simply been cut transversely to the longitudinal axis and the outer edge rounded a little bit. As with stud screw members 52, these stud screw members preferably have a standard metric thread of M10 and a property class of 10.9 or 12.9 according to German Standard DIN ISO 898 T1, Einführung in die DIN-Normen, 1985. These materials have good strength and wear-resistant properties. It is understood that the hold-down member is not limited to these property classes as any suitable property class can be used. For example, property classes 5.8, 6.8, 8.8, and 9.8 of DIN ISO 898 T1 are also known to be acceptable.

Each of the stud screw members in FIGS. 6 to 11 is shown with a locking element 60 for preventing inadvertent loosening of the hold-down element once it has been set to its operative position as explained above. In FIGS. 6 and 8–11, the locking element 60 comprises a thin layer of material, preferably a synthetic adhesive-like material, that is applied to a ring-like area 82 of the thread of the stud screw. Such locking elements are known in the art and allow removal of the bolt when necessary.

In FIG. 7 another locking element embodiment is shown. A groove 84 is provided in the wall of the stud screw and a ring 86 of locking material embedded therein. Ring 86 projects radially into the path of the stud screw 72 just enough to create the desired amount of friction for the stud screw to stay in place. Any type of suitable locking element, including any type of locking means as known in the art, may be used to lock the hold-down member in place and prevent inadvertent loosening.

Figure 8:
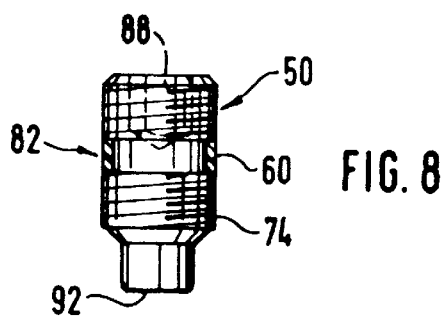
FIG. 8 is a side view of still another embodiment of a hold-down member.
Figure 9:
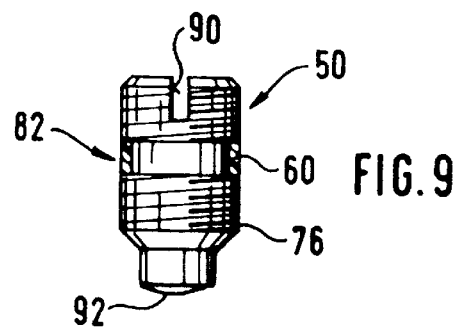
FIG. 9 is a side view of another embodiment of a hold-down member.
Figure 10:
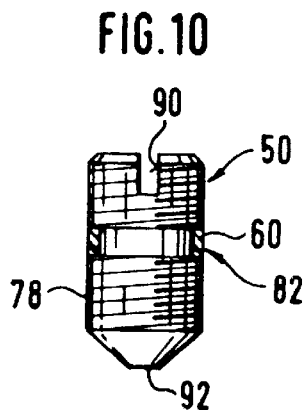
FIG. 10 is a side view of another embodiment of a hold-down member.

In FIGS. 6 and 8, the stud screw member is shown as having a hexagon socket 88, whereas in FIGS. 7, 9, 10, and 11, a screw slot 90 is provided for turning the bolt member. Any means for rotating the hold-down member may be used.

Figure 12:
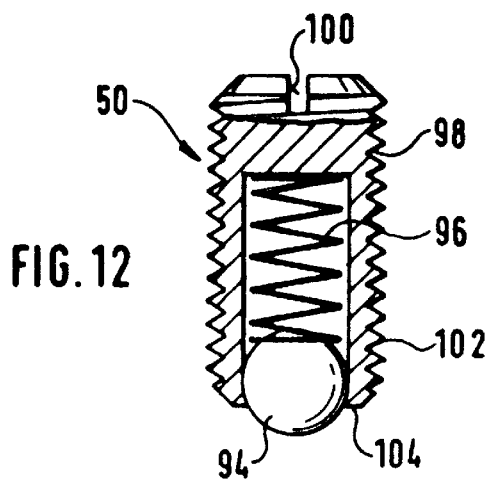
FIG. 12 is an enlarged sectional view of a further embodiment of a hold-down member.
Figure 13:
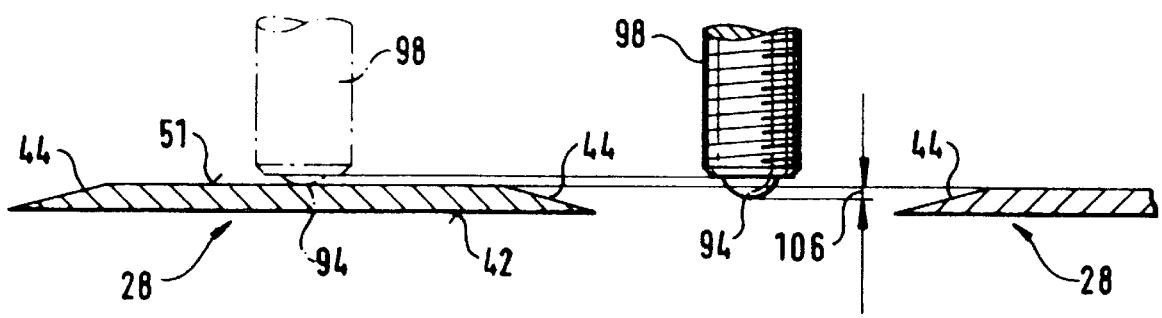
FIG. 13 is a partial sectional view taken along line XIII—XIII in FIG. 1.

Illustrated in FIGS. 12 and 13 is another embodiment of the hold-down member 50. FIG. 12 shows a hold-down member having a ball 94 biased into contact with the top face of the knife section 28. The ball 94 is biased into contact with the top face of the knife section 28 by a biasing member 96 located within the hold-down member 50 which is formed as a screw member 98. The biasing member 96 comprises a compression spring in the illustrated embodiment. The magnitude of the biasing force can be adjusted by the introduction of a screwdriver into an upper screw slot 100 of the screw member 98 which can then be rotated relative to the upper trashbar 48.

As show in FIG. 12, the screw sleeve 102 of the screw member 98 extends down below the horizontal diameter of the ball 94 to form an abutment edge and thus forms a stop 104 which limits the outward movement of the ball 94 from the screw member 98.

This limiting effect is illustrated in FIG. 13, where at the left-hand side in chain-dotted lines the ball 94 is shown in contact with the top face 51 of the knife section 28. In contrast, at the right-hand side of FIG. 13, in solid lines, the ball 94 is shown in the position which it adopts when the ball 94 has overrun the facet 44 of the knife section 28 by a small amount and then has been prevented from further outward movement by the stop 104. This defines a pressure stroke 106 for the ball 94. This pressure stroke 106 can be kept comparatively small.

It will be recognized by those skilled in the art that changes may be made to the above-described embodiments without departing from the broad scope of the invention. It is understood that this invention is not limited to the particular embodiments disclosed, but is intended to cover all modifications which are within the scope and spirit of the invention as defined by the appended claims.

What is claimed:

1. A cutter assembly comprising:
    at least two guards laterally spaced from and adjacent one another, each said guard comprising a guard body and a tine secured to said guard body;
    wherein each said guard has a knife slot between said guard body and said tine to receive a knife section secured to a reciprocating knife back;
    wherein each said guard body has a ledger surface facing said knife section, said ledger surface having lateral cutting edges;
    wherein said knife section has knife section cutting edges;
    at least one connecting web fixed between adjacent said guard bodies of said adjacent guards;
    each said guard being releasably securable to a cutter bar;
    an upper trashbar fixed to and extending between adjacent said tines of said adjacent guards; and
    hold-down means for holding down said knife section in the direction toward said ledger surface of said guard bodies, wherein said hold-down means extends from said upper trashbar and is movable into contact with a top face of said knife section.

2. A cutter assembly according to claim 1 wherein said hold-down means is adjustable relative to said trashbar in a direction towards and away from said knife section.

3. A cutter assembly according to claim 2 wherein said hold-down means has an external thread, and said upper trashbar has a threaded hole to receive said threaded hold-down means.

4. A cutter assembly according to claim 1 wherein said hold-down means comprises a ball member and a biasing member biasing said ball member into contact with said top face of the knife section.

5. A cutter assembly according to claim 4 wherein said hold-down means further comprises stop means to limit displacement of said ball member.

6. A cutter assembly according to claim 1 wherein said hold-down means is positioned in the approximate center between said guards.

7. A cutter assembly according to claim 1 wherein said hold-down means comprises a stud screw member.

8. A cutter assembly according to claim 7 wherein said hold-down means further comprises a locking element to prevent inadvertent loosening of said stud screw.

9. A cutter assembly according to claim 3 wherein said hold-down means comprises a locking element to prevent inadvertent loosening of said hold-down means.

10. A cutter assembly according to claim 9 wherein said locking element comprises a longitudinal slot in the outer side of said hold down means and a strip of material therein providing sufficient friction to prevent loosening of said hold down means.

11. A cutter assembly according to claim 9 wherein said locking element comprises a transverse blind hole in the outer side of said hold down means and a plug of material therein providing sufficient friction to prevent loosening of said hold down means.

12. A cutter assembly according to claim 1 having a plurality of said hold-down means.

13. A cutter apparatus combinable with a reciprocable knife section, said apparatus comprising:
a first and a second guard spaced from one another, each said guard comprising
a guard body,
a tine secured to a forward section of said guard body,
a knife slot between said guard body and said tine for receiving the knife section, and
a ledger surface positioned to face the underside of said knife section when the knife section is received in said knife slot;
at least one connecting web fixed between said first and second guards;
an upper trashbar extending from the tine of said first guard to the tine of said second guard above said knife section; and
a hold-down member extending downward from said upper trashbar and positionable above the knife section to limit the upward movement of said knife section relative to the ledger surface.

14. An apparatus in accordance with claim 13 having a plurality of said hold-down members.

15. An apparatus according to claim 13 wherein said hold-down member is adjustable relative to said upper trashbar in the direction towards and away from said knife section.

16. An apparatus according to claim 13 wherein said hold-down member has an external thread, and said upper trashbar has a threaded hole to receive said threaded hold-down member.

17. An apparatus according to claim 13 wherein said hold-down member comprises a biasing member for biasing the hold-down member into contact with the top face of said knife section.

18. An apparatus according to claim 13 wherein said hold-down member comprises a stud screw member having an external thread.

19. An apparatus according to claim 16 wherein said hold-down member comprises a locking element to prevent inadvertent loosening of said hold-down member.

20. An apparatus according to claim 18 wherein said hold-down member comprises a locking element to prevent inadvertent loosening of said stud screw member.

21. An apparatus according to claim 19 wherein said locking element comprises a longitudinal slot disposed in the outer side of said stud screw member, and a strip of material providing sufficient friction to prevent loosening of said stud screw disposed in said longitudinal slot.

22. An apparatus according to claim 19 wherein said locking element comprises a transverse blind hole disposed in the outer side of said stud screw member, and a plug of material providing sufficient friction to prevent loosening of said stud screw disposed in said transverse blind hole.

23. A cutter apparatus combinable with a reciprocable knife section, said apparatus comprising:
a first and a second guard spaced from one another, each said guard comprising
a guard body,
a tine secured to a forward section of said guard body,
a knife slot between said guard body and said tine for receiving the knife section, and
a ledger surface positioned to face said knife section when said knife section is received;
an upper trashbar fixed to and between said tines of said first and second guards, said upper trashbar having a threaded hole; and
a stud screw member having an external thread for fitting into said threaded hole, said stud screw member extending downward from said upper trashbar and adjustable into contact with a top face of the knife section to limit the upward movement of the knife section.

24. A cutter apparatus according to claim 23 further comprising a locking element secured to said screw member and positioned to frictionally engage said threaded hole to prevent inadvertent loosening of said stud screw member.

25. A cutter apparatus according to claim 23 further comprising at least one connecting web fixed between said first and second guards.

* * * * *